United States Patent
Eves et al.

(10) Patent No.: US 9,284,899 B2
(45) Date of Patent: Mar. 15, 2016

(54) METHOD AND SYSTEM OF CLEANING A CONTROL VALVE

(71) Applicant: Ford Global Technologies, LLC, Dearborn, MI (US)

(72) Inventors: Brian David Eves, Basildon (GB); Shane Keilthy, Coggeshall (GB); Mike Acton, Basildon (GB); Tom Leroy, Dagenham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 14/321,734

(22) Filed: Jul. 1, 2014

(65) Prior Publication Data

US 2015/0047345 A1 Feb. 19, 2015

(30) Foreign Application Priority Data

Aug. 13, 2013 (GB) .................................. 1314463.9

(51) Int. Cl.

| | | |
|---|---|---|
| *F02D 23/00* | (2006.01) | |
| *F02D 41/00* | (2006.01) | |
| *F02B 37/12* | (2006.01) | |
| *F02B 37/16* | (2006.01) | |
| *F02D 41/22* | (2006.01) | |
| *F02B 37/18* | (2006.01) | |
| *F02B 39/16* | (2006.01) | |
| *F02D 41/04* | (2006.01) | |
| *F02D 11/10* | (2006.01) | |

(52) U.S. Cl.
CPC .......... *F02D 41/0007* (2013.01); *F02B 37/127* (2013.01); *F02B 37/16* (2013.01); *F02B 37/186* (2013.01); *F02B 39/16* (2013.01); *F02D 41/22* (2013.01); *F02B 2037/162* (2013.01); *F02D 11/10* (2013.01); *F02D 41/04* (2013.01); *F02D 41/221* (2013.01)

(58) Field of Classification Search
CPC .. F02B 2037/162; F02B 37/127; F02B 37/16; F02B 37/186; F02B 39/16; F02D 11/10; F02D 41/0007; F02D 41/04; F02D 41/22; F02D 41/221
See application file for complete search history.

(56) References Cited

U.S. PATENT DOCUMENTS

| | | | |
|---|---|---|---|
| 4,211,081 A | 7/1980 | Yamada | |
| 4,442,672 A | 4/1984 | Fischer | |
| 5,234,031 A | 8/1993 | Pickett et al. | |
| 8,205,599 B2 | 6/2012 | McDonald et al. | |

(Continued)

FOREIGN PATENT DOCUMENTS

| | | |
|---|---|---|
| GB | 1519108 | 7/1978 |
| GB | 2042635 A | 9/1980 |
| GB | 2172657 A | 9/1986 |

*Primary Examiner* — Jesse Bogue
(74) *Attorney, Agent, or Firm* — Julia Voutyras; Alleman Hall McCoy Russell & Tuttle LLP

(57) ABSTRACT

A method and system of cleaning a turbocharger bypass control valve, the control valve being operable to vary the position of a bypass valve and thereby vary the amount of flow bypass across a turbine and/or compressor of a turbocharger for an engine. The method comprises: determining whether the control valve may require cleaning; adjusting the duty cycle of the shuttle so as to increase a flow of fluid through the control valve and clean the control valve; and adjusting a throttle position of the engine and thus the engine torque output to compensate for the adjustment in the amount of boost provided by the turbocharger.

20 Claims, 5 Drawing Sheets

(56) References Cited

U.S. PATENT DOCUMENTS

| | | | |
|---|---|---|---|
| 2003/0029168 A1 | 2/2003 | Hercey et al. | |
| 2004/0216519 A1* | 11/2004 | Baeuerle | F02B 39/16 73/114.38 |
| 2012/0060492 A1* | 3/2012 | Pursifull | F02D 41/005 60/602 |
| 2012/0191321 A1* | 7/2012 | Ibuki | F02B 37/004 701/102 |
| 2012/0210711 A1* | 8/2012 | Petrovic | F02B 37/013 60/602 |
| 2013/0066535 A1* | 3/2013 | Leone | F02D 41/008 701/103 |
| 2015/0000707 A1* | 1/2015 | Takahashi | H01J 37/32449 134/22.18 |

* cited by examiner

METHOD AND SYSTEM OF CLEANING A CONTROL VALVE

CROSS REFERENCE TO RELATED APPLICATIONS

The present application claims priority to Great Britain Patent Application No. 1314463.9, "A METHOD AND SYSTEM OF CLEANING A CONTROL VALVE," filed Aug. 13, 2013, the entire contents of which are hereby incorporated by reference for all purposes.

FIELD

The present disclosure relates a method and system of cleaning a control valve and particularly but not exclusively relates to a method and system of cleaning a turbocharger bypass control valve.

Background/Summary

Internal combustion engines with a turbocharger improve the engines power output and reduce emissions. Typically, the turbocharger is arranged as an exhaust gas driven turbine driving a compressor mounted on a shared shaft. Turbochargers incorporate a bypass valve, known as a wastegate valve, which is used to control a flow of exhaust gas in a bypass passage arranged in parallel to a turbine of the turbocharger in order to control the boost amount to the engine. During operation, the control valve used to position the wastegate valve may become contaminated resulting in loss of functionality, causing the responsiveness of the wastegate valve to suffer and thus may cause insufficient boost to be delivered to the engine.

One approach to make sure boost may be delivered to the engine should a control valve become contaminated and lose functionality is to use a bias spring in the wastegate valve which leaves the wastegate partially open. Therefore, should the control valve functionality degrade, the wastegate still remains open to protect the turbine and boost is still provided to the engine. One potential issue with the above approach is that the wastegate valve may not fully close; therefore a maximum amount of boost may not be provided to the engine during operation.

A potential approach to at least partially address some of the above issues includes a method to clean the control valve to remove contamination. The turbocharger bypass control valve is operable to vary the position of a bypass valve and thereby vary the amount of flow bypass across a turbine and/or compressor of a turbocharger for an engine. The control valve is in fluidic communication with a fluid at a first reference pressure and a fluid at a second reference pressure, the control valve comprising a movable shuttle configured to selectively transmit the first reference pressure or second reference pressure such that a duty cycle of the shuttle determines an output pressure of the control valve. The position of the bypass valve is determined by the output pressure of the control valve. The method comprises determining whether the control valve may require cleaning, adjusting the duty cycle of the shuttle so as to increase a flow of fluid through the control valve and clean the control valve, and adjusting a throttle position of the engine and thus the engine torque output to compensate for the adjustment in the amount of boost provided by the turbocharger. In this way, the functionality of the control valve may not be decreased.

As an example, during acceleration, the engine speed is high and the wastegate may be positioned to allow a large amount of exhaust gas through the turbine, thereby providing more boost to the engine. However, if the control valve is contaminated, the wastegate may be positioned improperly and cause insufficient boost to be delivered to the engine. The method may determine that the control valve requires cleaning since the performance of the control valve is less than a predetermined performance threshold due to contaminant build up. The method may then adjust the duty cycle of the reciprocating shuttle of the control valve while simultaneously adjusting the throttle position such that the desired amount of engine boost is provided while the control valve is cleaned. Thus, the control valve is cleaned in a manner such that the driver does not perceive a difference in the performance of the vehicle.

In this way, the control valve for a wastegate valve may be cleaned during normal engine operating conditions, such as when the engine is combusting and the intake manifold pressure is boosted, to remove contaminants and still provide boost to the engine. By adjusting the duty cycle of the reciprocating shuttle, the wastegate valve position changes, causing a change in the boost provided to the engine. The throttle is then operated to compensate for the wastegate movement during the control valve cleaning. This allows for proper operation of the wastegate valve by maintaining the functionality of the control valve.

It should be appreciated that the inventors herein have recognized the above issues and approach to address them, and the inventors do not admit that such issues where known.

It should also be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
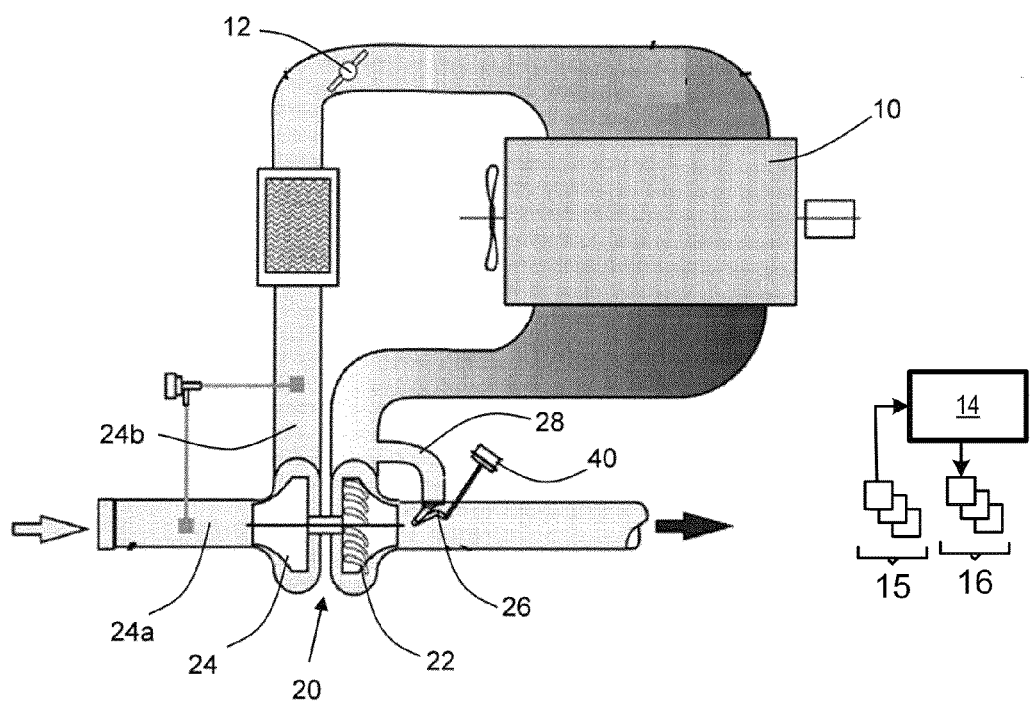
FIG. 1 shows a schematic view of an engine and turbocharger arrangement with a wastegate.
Figure 2:
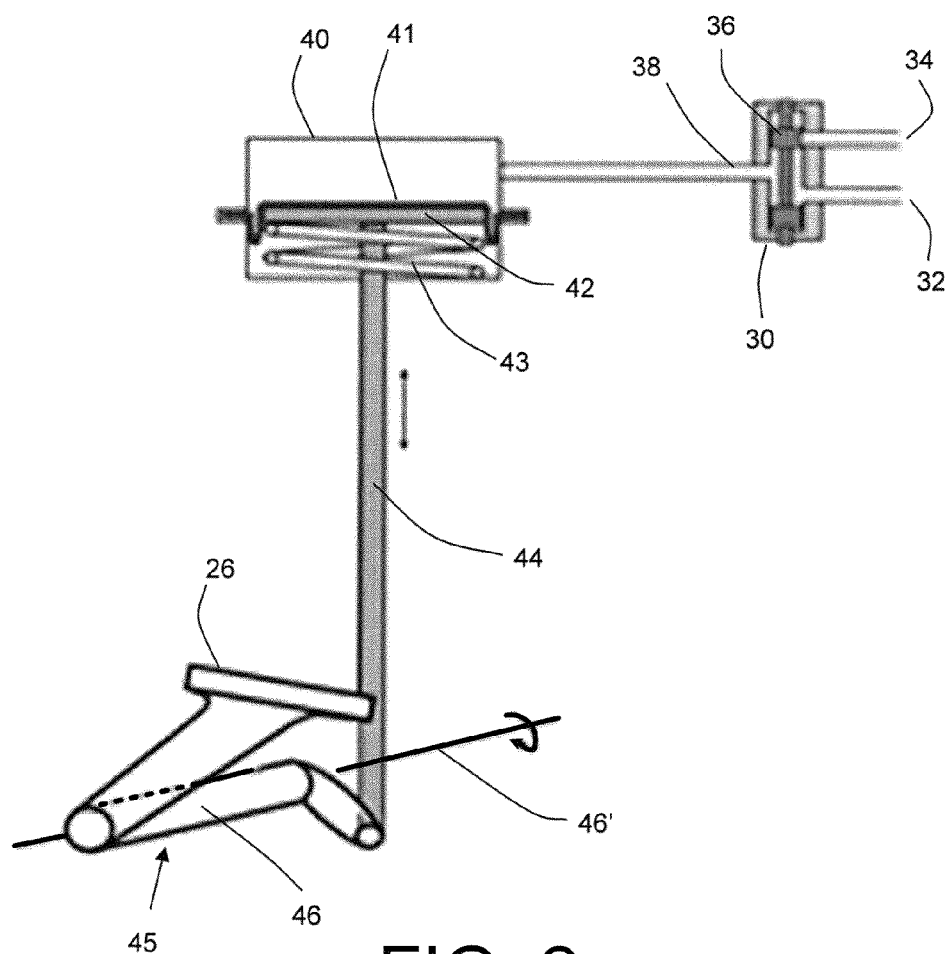
FIG. 2 shows a schematic view of a wastegate assembly for controlling the position of a turbocharger wastegate.
Figure 3:
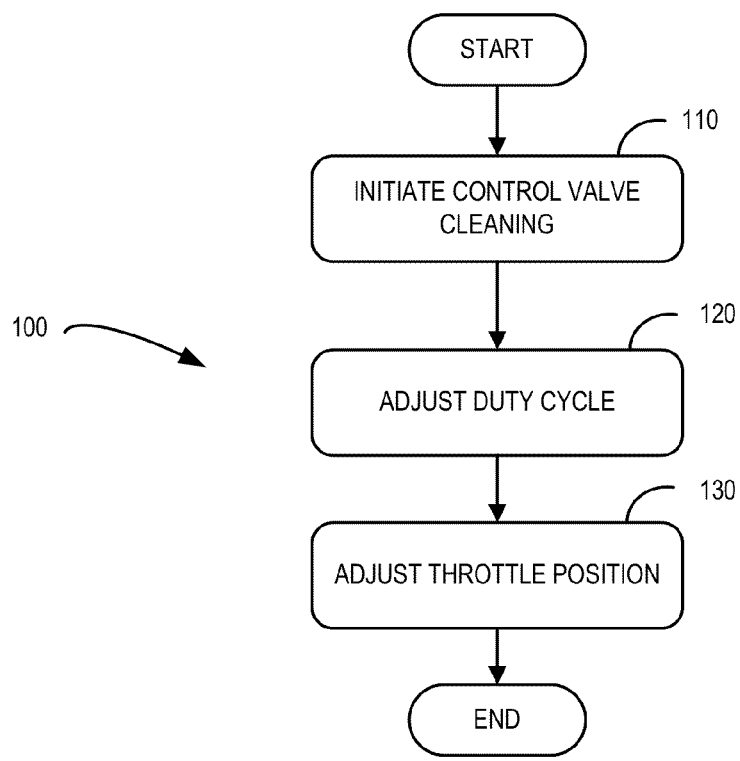
FIG. 3 shows a method of cleaning a control valve according to an example of the present disclosure.
Figure 4:
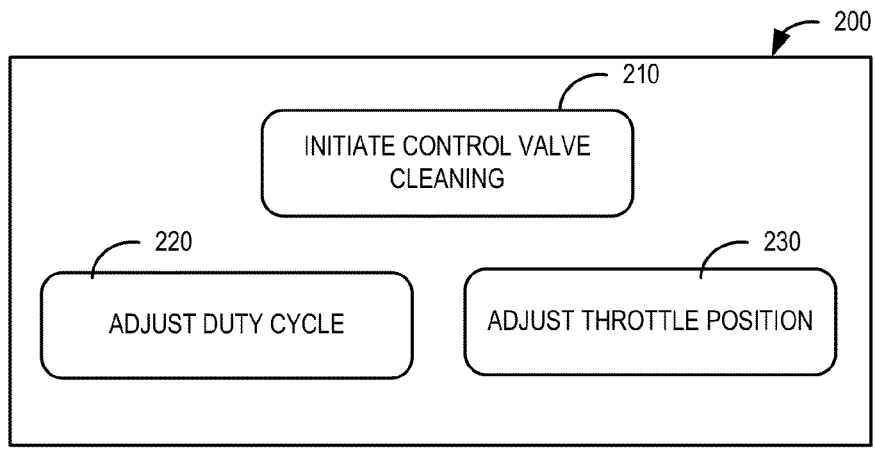
FIG. 4 shows a system of cleaning a control valve according to an example of the present disclosure.
Figure 5:
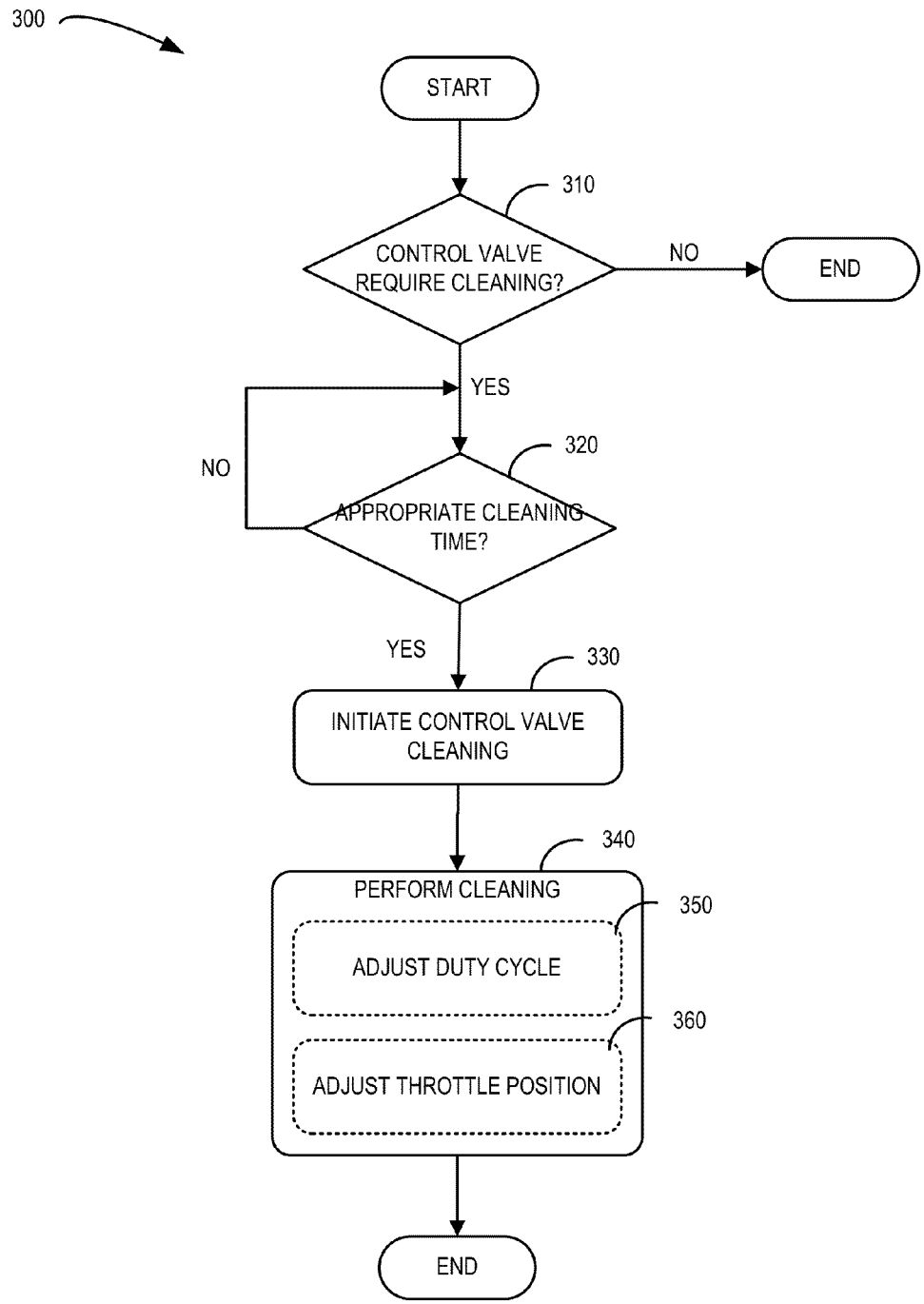
FIG. 5 shows an example method of cleaning the control valve according to an example of the present disclosure.

The present disclosure relates to a method and system to clean a control valve which positions a wastegate valve used to modulate the amount of exhaust gas flowing through the turbine as shown in FIGS. 1 and 2 to provide engine boost. The method may adjust the shuttle to modulate the pressures provided to the control valve in order to remove contaminants and further adjust the throttle to compensate for the adjustment in the amount of boost provided by the turbocharger as illustrated in FIGS. 3, 4 and 5. The control valve may be determined to require cleaning based on various parameters, examples of which are outlined in FIG. 6.

According to a first aspect of the present disclosure there is provided a method of cleaning a turbocharger bypass control valve, the control valve being operable to vary the position of a bypass valve and thereby vary the amount of flow bypass across a turbine and/or compressor of a turbocharger for an engine. The control valve is in fluidic communication with a fluid at a first reference pressure and a fluid at a second reference pressure, wherein the control valve comprises a movable shuttle configured to selectively transmit the first reference pressure or second reference pressure such that a duty cycle of the shuttle determines an output pressure of the control valve. Thus the position of the bypass valve is determined by the output pressure of the control valve. The method comprises: determining whether the control valve may require cleaning; adjusting the duty cycle of the shuttle so as to increase a flow of fluid through the control valve and clean the control valve; and adjusting a throttle position of the engine and thus the engine torque output to compensate for the adjustment in the amount of boost provided by the turbocharger.

The control valve output pressure may be equal to either, or between, the first and second reference pressures. The first reference pressure may correspond to the turbocharger compressor inlet pressure. The second reference pressure may correspond to the turbocharger compressor outlet pressure.

The control valve may comprise a first inlet for the first reference pressure. The control valve may comprise a second inlet for the second reference pressure. The shuttle may reciprocate. The shuttle may alternatingly block the first and second inlets. There may be a flow of fluid from the first inlet to the second inlet or vice versa, e.g. as the shuttle reciprocates.

The shuttle may be selectively moved by a solenoid. For example, the control valve may comprise a pulse width modulated solenoid driven valve.

The method may further comprise maintaining a substantially constant engine torque output.

The method may further comprise adjusting the duty cycle of the shuttle so as to increase the amount of boost provided by the turbocharger; and adjusting the throttle position of the engine so as to reduce the engine torque output.

The method may further comprise adjusting the duty cycle of the shuttle so as to reduce the amount of boost provided by the turbocharger; and adjusting the throttle position of the engine so as to increase the engine torque output. The reduction in the amount of boost by the turbocharger may occur before or after an increase in the amount of boost provided by the turbocharger.

The method may further comprise adjusting the duty cycle of the shuttle (whether by decrease or increase) such that the duty cycle is closer to a substantially 50% ratio. A 50% duty cycle ratio may correspond to the shuttle blocking the first and second control valve inlets for equal lengths of time. The throttle position of the engine may be adjusted, e.g. to maintain a substantially constant engine torque output.

The shuttle duty cycle, and thus the amount of boost by the turbocharger, may be returned to pre-adjustment levels, e.g. once it is determined that the control valve is clean or after a set amount of time.

Determining whether the control valve may require cleaning may comprise monitoring the performance of one or more of the control valve, bypass valve, turbocharger and engine and determining if the performance is below a predetermined performance threshold.

Determining whether the control valve may require cleaning may comprise determining the length of time the control valve has been operating since a previous clean of the control valve. When the length of time reaches a threshold value, the control valve may be cleaned. Accordingly, the method may comprise periodically cleaning the control valve based on the length of time since the previous clean of the control valve.

Determining whether the control valve may require cleaning may comprise determining the length of time the control valve output pressure, bypass valve position or shuttle duty cycle is above an upper threshold value and/or below a lower threshold value. When the length of time reaches a threshold value, the control valve may be cleaned.

Determining whether the control valve may require cleaning may comprise integrating with respect to time a function dependent on the control valve output pressure, shuttle duty cycle and/or bypass valve position and comparing the result of the integration with a threshold value. The integration may be performed since a previous clean of the control valve, e.g. once the control valve has been cleaned the value resulting from the integration may be reset to zero.

Determining whether the control valve may require cleaning may comprise sensing, e.g. with a sensor, whether contaminants have built up within the control valve.

According to a second aspect of the present disclosure there is provided a system for cleaning a turbocharger bypass control valve, the control valve being operable to vary the position of a bypass valve and thereby vary the amount of flow bypass across a turbine and/or compressor of a turbocharger for an engine, wherein the control valve is in fluidic communication with a fluid at a first reference pressure and a fluid at a second reference pressure, the control valve comprising a movable shuttle configured to selectively transmit the first reference pressure or second reference pressure such that a duty cycle of the shuttle determines an output pressure of the control valve, the position of the bypass valve being determined by the output pressure of the control valve, wherein the system comprises one or more controllers, e.g. modules, configured to: determine whether the control valve may require cleaning; adjust the duty cycle of the shuttle so as to increase a flow of fluid through the control valve and clean the control valve; and adjust a throttle position of the engine and thus the engine torque output to compensate for the adjustment in the amount of boost provided by the turbocharger.

The one or more controllers may be further configured to maintain a substantially constant engine torque output.

The one or more controllers may be further configured to adjust the duty cycle of the shuttle so as to increase the amount of boost provided by the turbocharger; and adjust the throttle position of the engine so as to reduce the engine torque output.

The one or more controllers may be further configured to adjust the duty cycle of the shuttle so as to reduce the amount of boost provided by the turbocharger; and adjust the throttle position of the engine so as to increase the engine torque output.

The one or more controllers may be further configured to adjust the duty cycle of the shuttle such that the duty cycle is closer to a substantially 50% ratio.

The one or more controllers may be further configured to monitor the performance of one or more of the control valve, bypass valve, turbocharger and engine and determine if the performance is below a predetermined performance threshold.

The one or more controllers may be further configured to determine the length of time the control valve has been operating since a previous clean of the control valve.

The one or more controllers may be further configured to determine the length of time the control valve output pressure, bypass valve position or shuttle duty cycle is above an upper threshold value and/or below a lower threshold value.

The one or more controllers may be further configured to integrate with respect to time a function dependent on the control valve output pressure, shuttle duty cycle and/or bypass valve position and compare the result of the integration with a threshold value.

The system may comprise one or more sensors configured to sense whether contaminants have built up within the control valve.

The present application also provides software such as a computer program or a computer program product for carrying out the methods described herein, and a computer readable medium having stored thereon a program for carrying out any of the methods described herein. A computer program embodying the present application may be stored on a computer-readable medium, or it could, for example, be in the form of a signal such as a downloadable data signal provided from an Internet website, or it could be in any other form.

A vehicle or engine may comprise the above-mentioned system for cleaning a turbocharger bypass control valve.

According to a further aspect of the present disclosure there is provided a method of cleaning a control valve, wherein the control valve is in fluidic communication with a fluid at a first reference pressure and a fluid at a second reference pressure, the control valve comprising a movable shuttle configured to selectively transmit the first reference pressure or second reference pressure such that a duty cycle of the shuttle determines an output pressure of the control valve, wherein the method comprises: determining whether the control valve may require cleaning; and adjusting the duty cycle of the shuttle so as to increase a flow of fluid through the control valve and clean the control valve.

According to another aspect of the present disclosure there is provided a system for cleaning a control valve, wherein the control valve is in fluidic communication with a fluid at a first reference pressure and a fluid at a second reference pressure, the control valve comprising a movable shuttle configured to selectively transmit the first reference pressure or second reference pressure such that a duty cycle of the shuttle determines an output pressure of the control valve, wherein the system comprises one or more controllers, e.g. modules, configured to: determine whether the control valve may require cleaning; and adjust the duty cycle of the shuttle so as to increase a flow of fluid through the control valve and clean the control valve.

For a better understanding of the present disclosure, and to show more clearly how it may be carried into effect, reference will now be made, by way of example, to the accompanying FIGS.

With reference to FIG. 1, it is well known to provide an internal combustion engine 10 with a turbocharger 20 to improve its power output and reduce emissions. Typically, the turbocharger 20 is arranged with an exhaust gas driven turbine 22 driving a compressor 24 mounted on the same shaft. In addition, such turbochargers 20 often incorporate a bypass valve, known as a wastegate valve 26, which is used to control the flow of exhaust gas in a bypass passage 28 arranged in parallel to the turbine 22 of the turbocharger. The wastegate valve 26 may be used to modulate the amount of exhaust gas flowing through the turbine 22 and thereby change the power available to drive the compressor 24. Accordingly, the performance boost provided by the turbocharger 20 may be controlled by the position of the wastegate valve 26. Typically, an aim of the boosting by the turbocharger 20 is to run the engine 10 with the lowest possible level of throttling by throttle 12, thereby reducing the pumping losses. The position of the control valve 30, the wastegate valve 26, and throttle 12 may be controlled by a controller 14 which is configured to receive various inputs 15 and send various outputs 16. Controller 14 may be programmed to run control valve cleaning methods, such as those in FIGS. 3, 4, and 5.

With reference to FIG. 2, the position of the wastegate valve 26 may be controlled by a control valve 30. The control valve 30 is in fluidic communication with first and second reference pressures via first and second inlets 32, 34 respectively. For example, the first and second inlets 32, 34 may be in fluidic communication with the inlet 24a and the outlet 24b of the compressor 24 respectively. The control valve 30 modulates the first and second reference pressures by virtue of a reciprocating shuttle 36, which is configured to selectively transmit the first or second reference pressures to an outlet 38 of the control valve. In this way, the control valve 30 provides an output pressure signal, which may be between the first and second reference pressures, and which may be varied by changing the duty cycle of the reciprocating shuttle. The shuttle 36 may be selectively moved by a solenoid, such that that the control valve 30 may comprise a pulse width modulated solenoid driven valve.

The output pressure signal from the control valve is in turn in fluidic communication with a wastegate capsule 40. The wastegate capsule 40 comprises a diaphragm 41 behind which there is a piston 42 acting against a spring 43. A connecting rod 44 attached to the piston 42 is configured to move the wastegate valve 26 via a linkage 45. The linkage 45 may comprise a rotatable portion 46, which may rotate about an axis 46' to move the wastegate valve 26 away from or towards a corresponding valve seat. The modulated output pressure from the control valve 30 acts on the diaphragm 42 so as to selectively move the piston 44 against the spring 46 and thus open or close the wastegate valve 26.

The air from the inlet and outlet of the compressor 24 may be contaminated, for example with oil, e.g. from engine blow-by gases, or other contaminants. Hence, under certain conditions, the control valve 30 may become contaminated with such contaminants resulting in loss of functionality of the control valve. The responsiveness of the wastegate valve may suffer as a result. The present disclosure seeks to address this issue.

With reference to FIGS. 3 and 4, the present disclosure relates to a method of and/or system for cleaning the control valve 30 described above with reference to FIGS. 1 and 2. As mentioned above, the control valve 30 may control the position of the wastegate valve 26 via the wastegate capsule 40 as described above.

Referring to FIG. 3, the method 100 according to the present disclosure comprises: a first step 110, which determines whether the control valve 30 may require cleaning; a second step 120, which adjusts the duty cycle of the shuttle 36 so as to increase a flow of fluid through the control valve and clean the control valve; and a third step 130, which adjusts a throttle 12 position of the engine 10 and thus the engine torque output to compensate for the adjustment in the amount of boost provided by the turbocharger 20. In one example, the second and third steps 120, 130 may occur at substantially the same time. In another example, the duty cycle may be adjusted at the second step 120 and after the adjustment is finished, the throttle may be adjusted at the third step 130.

Referring to FIG. 4, the system 200 according to the present disclosure comprises one or more controllers comprising a first module 210 configured to determine whether the control valve 30 may require cleaning; a second module 220 configured to adjust the duty cycle of the shuttle 36 so as to increase a flow of fluid through the control valve and clean the control valve; and a third module 230 configured to adjust a throttle 12 position of the engine 10 and thus the engine torque output to compensate for the adjustment in the amount of boost provided by the turbocharger 20.

The control valve 30 may comprise a first inlet 32 for the first reference pressure and a second inlet 34 for the second reference pressure. The shuttle 36 may reciprocate within the control valve so that it may alternatingly block the first and second inlets 32, 34. In this way the control valve 30 may modulate the first and second reference pressures such that the control valve output pressure may be equal to either, or between, the first and second reference pressures. As mentioned above, the first reference pressure may correspond to the turbocharger compressor inlet pressure and the second reference pressure may correspond to the turbocharger compressor outlet pressure.

As the shuttle reciprocates there may be a net flow of fluid from the first inlet 32 to the second inlet 34 or vice versa. It will be appreciated that a very low or a very high duty cycle will reduce such a net flow since one of the first and second inlets will be predominantly blocked with such a duty cycle. On the other hand the net flow will be increased at duty cycles away from these extremes since the first and second inlets are not blocked for as long. Therefore by varying the duty cycle of the shuttle valve the flow of fluid through the control valve may be increased. The increased flow of fluid through the control valve may carry with it contaminants that have built up in the control valve and the control valve may thus be cleaned.

It will be appreciated that the duty cycle of the shuttle may be adjusted (whether by decrease or increase) such that the duty cycle is closer to a substantially 50% ratio at which the net flow through the control valve may be at a maximum. The duty cycle is a ratio of the time the shuttle spends at one end of the control valve relative to the time period for one oscillation of the shuttle. Accordingly, a 50% duty cycle ratio may correspond to the shuttle blocking the first and second control valve inlets for equal lengths of time.

The duty cycle of the shuttle may be adjusted to increase the amount of boost provided by the turbocharger and the throttle position of the engine may then be adjusted to reduce the engine torque output. Once the cleaning has finished, the duty cycle of the shuttle may be adjusted to reduce the amount of boost provided by the turbocharger and the throttle position of the engine may be adjusted to increase the engine torque output. During this process a substantially constant engine torque output may be maintained, e.g. by controlling the throttle position, so that the driver does not perceive a difference in the performance of the vehicle.

Alternatively, the duty cycle of the shuttle may be adjusted to reduce the amount of boost provided by the turbocharger and the throttle position of the engine may then be adjusted to increase the engine torque output. Once the cleaning has finished, the duty cycle of the shuttle may be adjusted to a pre-cleaning level, as well as the throttle. Again, during this process a substantially constant engine torque output may be maintained, e.g. by controlling the throttle position, so that the driver does not perceive a difference in the performance of the vehicle.

The amount of turbocharger boost (i.e. the position of the wastegate valve) may be returned to pre-adjustment levels, e.g. once it is determined that the control valve is clean or after a set amount of time of cleaning.

The throttle position may be adjusted by a throttle controller, such as a Powertrain Control Module (PCM). The throttle controller may adjust the throttle position so as to maintain a contact torque output of the engine whilst the duty cycle of the shuttle (and thus the turbocharger boost) is being varied. The throttle controller may refer to a stored look-up table to determine how much adjustment of the throttle is required to compensate for the change in turbocharger boost. The data in the stored look-up table may be obtained from the known characteristics of the turbocharger and engine. Alternatively or additionally, a sensor may sense the engine torque output and the controller may adjust the throttle position, for example in a feedback loop.

Figure 6:
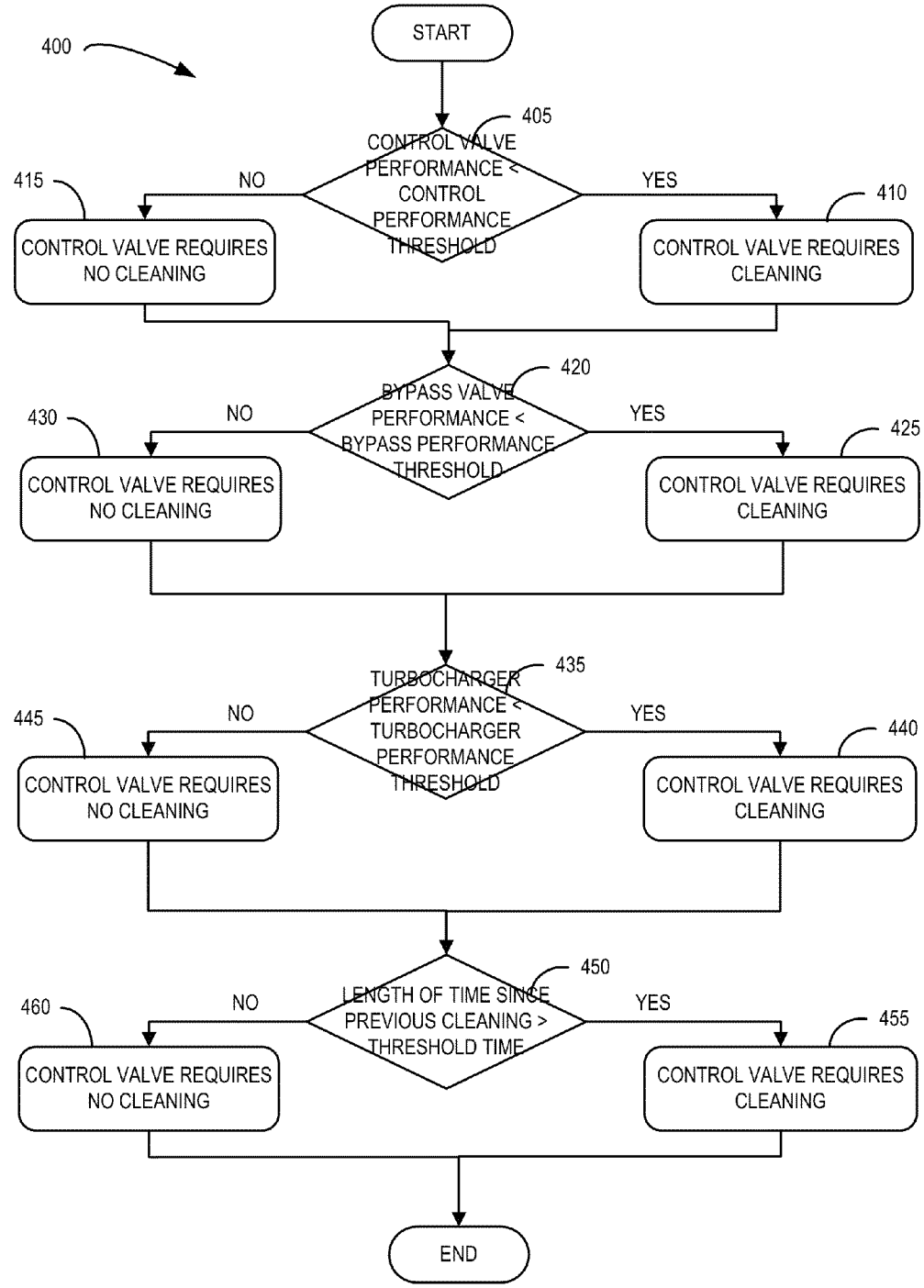
FIG. 6 shows a flow chart for determining if the control valve may require cleaning.

Turning to FIG. 5, an example method 300 for cleaning a control valve is provided. At step 310, the method may determine if the control valve requires cleaning. The conditions may include conditions which show the control valve experiencing a loss in functionality. FIG. 6 further elaborates conditions which may lead to requiring the control valve be cleaned. If the control valve does not require cleaning, the method ends. The method may proceed to step 320 if it is determined that the control valve requires cleaning. For example, the control valve may require cleaning if it is sensed that contaminants have built up within the control valve.

At step 320, the method may determine if it is an appropriate time to run the control valve cleaning. The cleaning of the control valve may be carried out at an appropriate point in the drive cycle of the engine. For example, if a high torque is required or likely to be required from the engine and high levels of boost from the turbocharger are thus required, it may be inappropriate to reduce the boost level to clean the control valve. On the other hand, if it is determined that the engine is in a low torque point in the drive cycle then it may be appropriate to clean the control valve, for example, by increasing the boost level and throttling the engine. The controller may determine whether it is an appropriate time to clean the control valve. The controller may base such a decision on a proposed vehicle route and knowledge of the likely engine torque requirements along that route. If it is determined that the control valve may require cleaning but it is not an appropriate point in the drive cycle to initiate cleaning the control valve, the actual cleaning may be delayed until the controller determines it is an appropriate point in the drive cycle to carry out the cleaning.

When it is determined to be an appropriate time for cleaning the control valve, the method may proceed to step 330 and initiate the control valve cleaning.

At step 340, the method may perform cleaning the control valve. This includes adjusting the duty cycle at 350 and adjusting the throttle positions at 360. Adjusting the duty cycle and throttle position may be performed substantially at the same time in order to maintain a substantially constant engine torque output. By doing this, the vehicle driver may not notice any changes in engine torque. In one example, the duty cycle of the shuttle of may be adjusted so as to increase the boost provided by the turbocharger and the throttle position of the engine may be adjusted so as to reduce the engine torque output in order to offset the increase in the boost due to the positioning of the shuttle during the cleaning cycle. In another example, the duty cycle of the shuttle may be adjusted so as to reduce the amount of boost provided by the turbocharger and the throttle position may be adjusted so as to increase the engine torque output in order to offset the decrease in the boost due to the positioning of the shuttle during the cleaning cycle. Thus, the adjustment to the throttle compensates for the adjustment to the duty cycle for cleaning the control valve so the engine torque remains fairly constant and so that the driver does not perceive a difference in the performance of the vehicle during the cleaning of the control valve.

The method for cleaning the control valve at steps 340, 350 and 360 may be run for a set period of time, in one example. In another example, the control valve cleaning may be run until the engine is no longer in a low torque point in the drive cycle, such as when a driver operates the accelerator pedal.

In yet another example, a diagnostic may be run to determine if the control valve is clean. The control valve performance may be monitored to be between an upper and lower performance threshold to indicate that the control valve is clean. In another example, the turbocharger performance may be monitored to be between an upper and lower performance threshold to indicate that the control valve is clean. If the control valve is not clean, e.g. the diagnostic is not passed, the control valve may be cleaned more than once in order to remove contaminants. If the diagnostic is passed, the control valve is cleaned and the amount of turbocharger boost (i.e. the position of the wastegate valve) may be returned to pre-adjustment levels.

Method 400 of FIG. 6 illustrates an example flow chart which may be used to determine if the control valve may require cleaning. Method 400 may be run at step 310 of FIG. 5, for example. In one example, only one condition may need to be met in order to require cleaning of the control valve. In another example, more than one condition may need to be met in order to require cleaning of the control valve. The controller may be configured to monitor the conditions. Further, the conditions may include monitoring the performance to be above or below a threshold for a time period before requiring cleaning of the control valve.

To determine whether the control valve may require cleaning, the performance of one or more of the control valve, bypass valve, turbocharger and engine may be monitored. For example, if the performance is below a predetermined performance threshold, it may be determined that the control valve may require cleaning.

At step 405, the control valve performance may be monitored to determine if the performance is below a predetermined control performance threshold. A control valve performance below the performance threshold may indicate the build-up of contaminants on the control valve. The control valve may require cleaning if this is the case at 410. If the control valves performance is not below the threshold, the control valve may require no cleaning at 415.

At step 420, the bypass valve performance may be monitored to determine if the bypass valve performance is below a bypass performance threshold. If the bypass valve performance decreases to a point where it is below a performance threshold, it may not be able to be adjusted to deliver the appropriate boost to the engine. This is an indication that the control valve may be suffering from a lack of functionality and is not able to position the bypass valve correctly. Therefore, the control valve may require cleaning at 425. If the bypass valve performance is not degraded, the control valve may require no cleaning at 430.

At step 435, the turbocharger performance is monitored to determine if the turbocharger performance is below a turbocharger performance threshold. If the turbocharger is not functioning properly and delivering a correct amount of boost, it may be an indication that the control valve is not functioning due to build-up of contaminants and the wastegate valve is not being positioned correctly. Thus, at 440, the control valve may require cleaning. If the turbocharger performance is above the turbocharger performance threshold, the control valve may require no cleaning at 445.

At 450, the length of time since the previous control valve cleaning is compared to a threshold time. If an amount of time has passed since the last cleaning which is greater than the threshold time, it may be determined that the control valve may require cleaning at 455. If an amount of time has passed since the last cleaning is less than the threshold time, it may be determined that the control valve may not require cleaning at 460. Thus, the method allows for cleaning of the control valve based on a time period. This may be done to maintain the functionality of the control valve before an indication of degraded performance occurs. Thus, the control valve may be cleaned at periodic intervals. Accordingly, the length of time the control valve has been operating since a previous clean of the control valve may be calculated and stored.

Again, alternatively or additionally, determining whether the control valve may require cleaning may comprise determining the length of time the control valve output pressure, bypass valve position or duty cycle is above an upper threshold value and/or below a lower threshold value. Accordingly, when this length of time reaches a predetermined threshold, it may be determined that the control valve may require cleaning. For example, the length of time that the control valve operates with a shuttle duty cycle above 80% and/or below 20% may be calculated and when this length of time reaches a predetermined threshold it may be determined that the control valve may require cleaning. The longer the control valve operates at a high or low duty cycle, the more likely contaminants are to build up since there is less flow through the control valve. Therefore calculating and storing the time spent at these extremes may serve as a useful measure of whether the control valve may need cleaning.

Building on the previously-mentioned way of determining whether the control valve may require cleaning, a function dependent on a variable, such as the control valve output pressure, shuttle duty cycle and/or bypass valve position, may be integrated with respect to time and the result of the integration may be compared with a predetermined threshold value to decide whether cleaning is required. The function may be an absolute difference between the variable and a value of the variable which results in the minimum accrual of contaminants in the control valve. For example, the absolute difference between the shuttle duty cycle D (expressed as a %) and a 50% duty cycle may be integrated with respect to time and compared against a threshold value T. As mentioned above, a 50% duty cycle may provide the maximum flow through the control valve and thus the cleanest mode of operation. The integration of duty cycle values away from this optimum may provide a measure of how contaminated the control valve may have become. When the result of the integration exceeds the threshold value T, the control valve may be cleaned. In other words the control valve may be cleaned when the expression below is satisfied:

$$\int |D-50\%| dt > T$$

This integration may be carried out by a controller, e.g. an onboard computer, and the result of the integration may be stored in memory. It will be appreciated that the integration may be performed since a previous clean of the control valve, e.g. once the control valve has been cleaned the value resulting from the integration may be reset to zero. The duty cycle may be a convenient variable to integrate since a controller will have determined the desired duty cycle of the shuttle and as such will be readily available. However, the control valve output pressure and/or bypass valve position may instead be measured and may also be integrated in a manner similar to that described above, i.e. integrating the absolute difference between the variable and an optimum value (e.g. a value of the variable which results in the minimum accrual of contaminants in the control valve).

It will be appreciated that when it is determined that the control valve may require cleaning, the control valve may not actually require cleaning. The control valve may be cleaned as a precaution, for example to avoid a drop in the performance of the control valve that might otherwise occur. Alternatively, or as a further way of determining that the control valve requires cleaning, one or more sensors may be provided to sense whether contaminants have built up within the control valve and the control valve may then be cleaned when a build-up of contaminants is sensed.

In one example, an engine method, comprises adjusting a boost-pressure-actuated wastegate based on operating conditions to increase flow to an actuating chamber responsive to requested valve cleaning while compensating for wastegate flow and boost changes by adjusting an engine intake throttle. The increased flow may be to a shuttle valve of a wastegate actuator coupled to the wastegate, and may remove particle buildup therein. The valve cleaning request may be generated and/or determined by the engine controller in various ways, as described above herein. The flow may include exhaust gas and/or intake fresh air, and may be directed to the shuttle valve, past and through the shuttle valve, and to a vacuum and/or pressure actuator chamber mechanically coupled through a diaphragm to the wastegate valve via a multi-bar linkage. The flow to the shuttle valve, in one example, is separate and distinct from the exhaust flow passing by the wastegate valve. Specifically, the flow past the shuttle valve may proceed only to the vacuum actuator chamber in one example.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

Note that in some example, terms such as high, low, large, small, etc., may be used and may indicate relative value. For example, different operation may occur at high engine speed and low engine speed, and in one example, this may include where high engine speed is higher than the low engine speed, and thus define a distinct and definite relationship with respect to each other is provided.

The invention claimed is:

1. A method of cleaning a turbocharger bypass control valve, the control valve being operable to vary a position of a bypass valve and thereby vary an amount of flow bypass across a turbine or compressor of a turbocharger for an engine,
    wherein the control valve is in fluidic communication with a fluid at a first reference pressure and a fluid at a second reference pressure, the control valve comprising a movable shuttle configured to selectively transmit the first reference pressure or second reference pressure such that a duty cycle of the shuttle determines an output pressure of the control valve, the position of the bypass valve being determined by an output pressure of the control valve,
    wherein the method comprises:
        determining whether the control valve requires cleaning;
        adjusting the duty cycle of the shuttle so as to increase a flow of fluid through the control valve and clean the control valve; and
        adjusting a throttle position of the engine and thus an engine torque output to compensate for an adjustment in an amount of boost provided by the turbocharger.

2. The method of claim 1, further comprising:
maintaining substantially constant engine torque output.

3. The method of claim 1, further comprising:
adjusting the duty cycle of the shuttle so as to increase the amount of boost provided by the turbocharger; and
adjusting the throttle position of the engine so as to reduce the engine torque output.

4. The method of claim 1, further comprising:
adjusting the duty cycle of the shuttle so as to reduce the amount of boost provided by the turbocharger; and
adjusting the throttle position of the engine so as to increase the engine torque output.

5. The method of claim 1, further comprising:
adjusting the duty cycle of the shuttle such that the duty cycle is closer to a substantially 50% ratio.

6. The method of claim 1, wherein determining whether the control valve requires cleaning further comprises:
monitoring a performance of one or more of the control valve, bypass valve, turbocharger and engine and determining if the performance is below a predetermined performance threshold.

7. The method of claim 1, wherein determining whether the control valve requires cleaning further comprises:
determining a length of time the control valve has been operating since a previous cleaning of the control valve.

8. The method of claim 1, wherein determining whether the control valve requires cleaning comprises:
determining a length of time the control valve output pressure, bypass valve position or shuttle duty cycle is above an upper threshold value and/or below a lower threshold value.

9. The method of claim 1, wherein determining whether the control valve requires cleaning further comprises:

integrating with respect to time a function dependent on the control valve output pressure, shuttle duty cycle and/or bypass valve position and comparing a result of the integration with a threshold value.

10. The method of claim 1, wherein determining whether the control valve requires cleaning further comprises:
sensing whether contaminants have built up within the control valve.

11. A system for cleaning a turbocharger bypass control valve, the control valve being operable to vary a position of a bypass valve and thereby vary an amount of flow bypass across a turbine and/or compressor of a turbocharger for an engine,
wherein the control valve is in fluidic communication with a fluid at a first reference pressure and a fluid at a second reference pressure, the control valve comprising a movable shuttle configured to selectively transmit the first reference pressure or second reference pressure such that a duty cycle of the shuttle determines an output pressure of the control valve, the position of the bypass valve being determined by an output pressure of the control valve,
wherein the system comprises one or more controllers configured to:
determine whether the control valve requires cleaning;
adjust the duty cycle of the shuttle so as to increase a flow of fluid through the control valve and clean the control valve; and
adjust a throttle position of the engine and thus an engine torque output to compensate for the adjustment in an amount of boost provided by the turbocharger.

12. The system of claim 11, wherein the one or more controllers are further configured to:
maintain substantially constant engine torque output.

13. The system of claim 11, wherein the one or more controllers are further configured to:
adjust the duty cycle of the shuttle so as to increase the amount of boost provided by the turbocharger; and
adjust the throttle position of the engine so as to reduce the engine torque output.

14. The system of claim 11, wherein the one or more controllers are further configured to:
adjust the duty cycle of the shuttle so as to reduce the amount of boost provided by the turbocharger; and
adjust the throttle position of the engine so as to increase the engine torque output.

15. The system of any of claim 11, wherein the one or more controllers are further configured to:
adjust the duty cycle of the shuttle such that the duty cycle is closer to a substantially 50% ratio.

16. The system of any of claim 11, wherein the one or more controllers are further configured to:
monitor a performance of one or more of the control valve, bypass valve, turbocharger and engine and determine if the performance is below a predetermined performance threshold.

17. The system of claim 11, wherein the one or more controllers are further configured to:
determine a length of time the control valve has been operating since a previous clean of the control valve.

18. The system of claim 11, wherein the one or more controllers are further configured to:
determine a length of time the control valve output pressure, bypass valve position or shuttle duty cycle is above an upper threshold value or below a lower threshold value.

19. The system of claim 11, wherein the one or more controllers are further configured to:
integrate with respect to time a function dependent on the control valve output pressure, shuttle duty cycle or bypass valve position and compare the result of the integration with a threshold value, and wherein the system comprises one or more sensors configured to sense whether contaminants have built up within the control valve.

20. An engine method, comprising:
adjusting a boost-pressure-actuated wastegate based on operating conditions to increase flow to an actuating chamber of the wastegate control valve responsive to requested valve cleaning of the wastegate control valve while compensating for wastegate flow and boost changes by adjusting an engine intake throttle.

* * * * *